T. Welham.
Carding Machine.
N° 88,997. Patented Apr. 13, 1869.
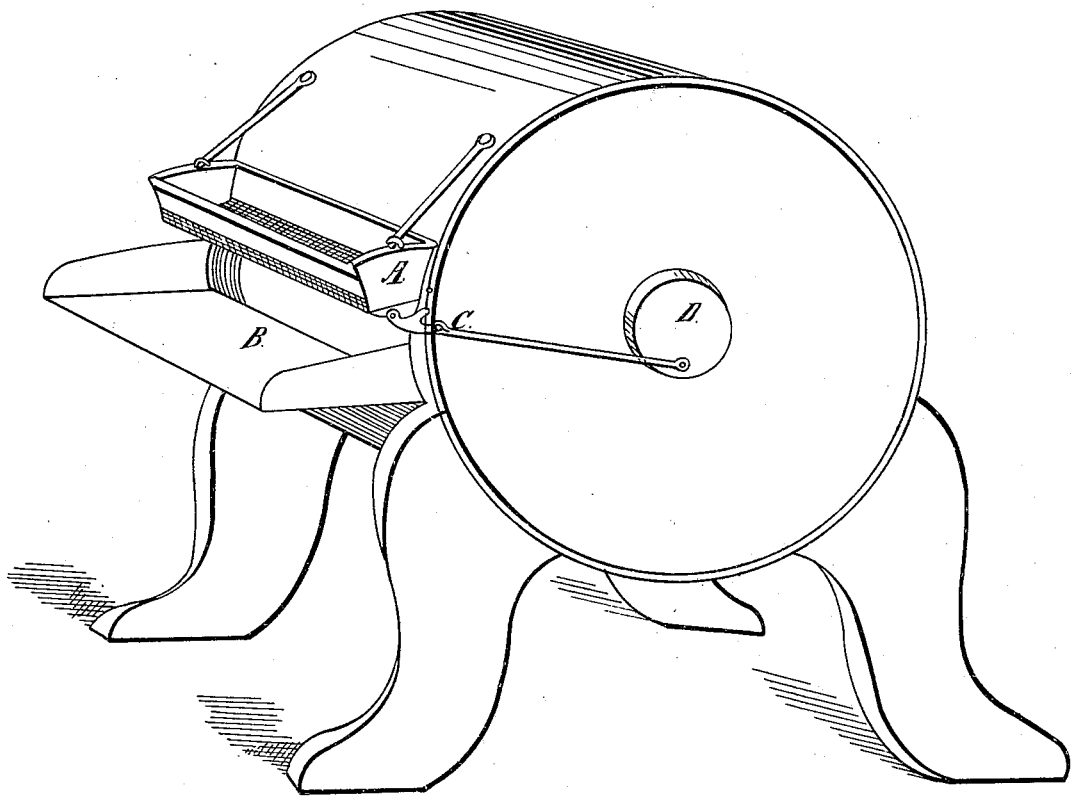
WITNESSES:
William Graf.
C Chabot
INVENTOR:
Thos Welham

UNITED STATES PATENT OFFICE.

THOMAS WELHAM, OF PHILADELPHIA, PENNSYLVANIA.

IMPROVEMENT IN MECHANISM FOR MIXING SOAP-STONE WITH COTTON BEING CARDED.

Specification forming part of Letters Patent No. 88,997, dated April 13, 1869.

*To all whom it may concern:*

Be it known that I, THOMAS WELHAM, of Philadelphia city and county, and State of Pennsylvania, have invented Improvements in Mechanism for Mixing Soap-Stone with Cotton or other Fibrous Materials, for lubricating the cards of a carding-machine; and I do hereby declare the following to be a full and correct description of the same, reference being had to the accompanying drawing, which represents a carding-machine with a sieve attached, for the purpose of sifting the lubricating material into the cotton as fed to the said machine.

Letter A shows the sieve, hung on pivots, so as to oscillate; letter B, the feed-trough of the carding-machine. Letter C shows the driving-rod as connected with the sieve and carding-machine; letter D, the driving-pulley of a carding-machine.

The cotton and soap-stone are mixed by carding them together in suitable proportions, as may be required, for the purpose of lubricating the card-teeth of a carding-machine, and to answer the same purpose in the manufacture of cotton as does oil in the manufacture of wool.

I mix two pounds, more or less, of soap-stone to ten pounds of cotton, and thoroughly mix them in the process of carding the cotton, and the cotton is then spun and woven as usual.

What I claim as my invention, and desire to secure by Letters Patent, is—

1. The combination of the sieve with a carding-machine, for the purpose set forth.

2. The driving-rod C and its connections, in combination with a sieve and a carding-machine, as shown and described.

The above specification of my said invention signed and witnessed, at Philadelphia, this 18th day of January, A. D. 1868.

THOS. WELHAM.

Witnesses:
   WM. RUNYAN,
   WM. DAVIS.